United States Patent
Alawani et al.

(10) Patent No.: US 9,571,393 B2
(45) Date of Patent: Feb. 14, 2017

(54) SYSTEMS AND METHODS FOR PROCESSING PACKETS TAPPED FROM A NETWORK

(71) Applicant: Gigamon Inc., Milpitas, CA (US)

(72) Inventors: Ashutosh Alawani, San Ramon, CA (US); Sreekanth Settipalli, San Mateo, CA (US); Tanmay Kishore, Fremont, CA (US); Dominick Cafarelli, Ossining, NY (US); Shehzad Merchant, Los Altos, CA (US)

(73) Assignee: Gigamon Inc., Santa Clara, CA (US)

( * ) Notice: Subject to any disclaimer, the term of this patent is extended or adjusted under 35 U.S.C. 154(b) by 114 days.

(21) Appl. No.: 14/547,024

(22) Filed: Nov. 18, 2014

(65) Prior Publication Data
US 2016/0142305 A1    May 19, 2016

(51) Int. Cl.
*H04L 12/741* (2013.01)
*H04W 48/16* (2009.01)
*H04L 12/931* (2013.01)

(52) U.S. Cl.
CPC ............. *H04L 45/74* (2013.01); *H04L 49/208* (2013.01); *H04W 48/16* (2013.01)

(58) Field of Classification Search
CPC ............................... H04L 45/74; H04W 48/16
See application file for complete search history.

(56) References Cited

U.S. PATENT DOCUMENTS

| 5,570,466 | A  | * | 10/1996 | Oechsle | H04L 45/26 370/401 |
|---|---|---|---|---|---|
| 8,767,840 | B2 |  | 7/2014 | Chuang | |
| 2003/0033430 | A1 | * | 2/2003 | Lau | F16H 55/0886 709/245 |
| 2015/0146725 | A1 |  | 5/2015 | Chan | |
| 2015/0207905 | A1 | * | 7/2015 | Merchant | H04L 69/22 370/390 |
| 2016/0142260 | A1 | * | 5/2016 | Cafarelli | H04L 43/12 370/250 |
| 2016/0142304 | A1 |  | 5/2016 | Alawani et al. | |

OTHER PUBLICATIONS

Non Final Office Action mailed Jun. 17, 2016 for U.S. Appl. No. 14/547,031 of Cafarelli, Dominick et al filed Nov. 18, 2014.
Notice of Allowance mailed Jul. 19, 2016 for U.S. Appl. No. 14/547,013 of Alawani, Ashutosh et al filed Nov. 18, 2014.

* cited by examiner

*Primary Examiner* — Christopher Grey
(74) *Attorney, Agent, or Firm* — Perkins Coie LLP

(57) ABSTRACT

A method performed by a network device that taps to a network having a routing device, includes: determining a first information regarding an input interface of the routing device for a packet; determining a second information regarding an output interface of the routing device for the packet; determining whether the packet belongs to a user-defined category based on one or more mapping formation defined at the network device; and storing the packet, the first information regarding the input interface of the routing device, the second information regarding the output interface of the routing device, and information regarding the user-defined category in a non-transitory medium in association with each other.

23 Claims, 7 Drawing Sheets

US 9,571,393 B2

SYSTEMS AND METHODS FOR PROCESSING PACKETS TAPPED FROM A NETWORK

FIELD

This application relates generally to network devices, and more specifically, to systems and methods for processing packets tapped from a network.

BACKGROUND

Packets and information regarding the packets may be generated by a traffic routing device, such as a router, a switch, etc. External tapping devices, such as TAPs, may tap into a network to obtain packets that are copies of the packets from the network. However, external tapping devices may not be able to obtain some information that only the traffic routing device knows. For example, the input interface at which the packet arrives, and/or the output interface from which the packet departs, is unknown to the external tapping device and cannot be determined by the external tapping device. The external monitor has no way of identifying that a particular packet arrived from a particular interface of the routing switching device.

SUMMARY

A method performed by a network device that taps to a network having a routing device, includes: determining a first information regarding an input interface of the routing device for a packet using a processing unit; determining a second information regarding an output interface of the routing device for the packet using the processing unit; determining whether the packet belongs to a user-defined category based on one or more mapping formation defined at the network device; and storing the packet, the first information regarding the input interface of the routing device, the second information regarding the output interface of the routing device, and information regarding the user-defined category in a non-transitory medium in association with each other.

Optionally, the network device comprises a plurality of network ports configured to communicate with the network, and a plurality of instrument ports configured to communicate with respective network monitoring instruments.

Optionally, the network device further comprises a processing unit configured to perform the acts of determining.

Optionally, the user-defined category is defined for a subscriber of the network device.

Optionally, the non-transitory medium comprises one or more data center.

Optionally, the act of determining the first information regarding the input interface of the routing device comprises: receiving a first packet tapped from the network; and determining the first information based on a destination address of the first packet.

Optionally, the act of determining the first information based on the destination address of the first packet comprises comparing the destination address of the first packet with a source address of a discovery protocol packet.

Optionally, the act of determining the second information regarding the output interface of the routing device comprises: receiving a second packet tapped from the network; and determining the second information based on a source address of the second packet.

Optionally, the act of determining the second information based on the source address of the second packet comprises comparing the source address of the second packet with a destination address of a discovery protocol packet.

Optionally, the method further includes: determining a first CRC for the first packet; determining a second CRC for the second packet; and comparing the first CRC with the second CRC at the network device to determine whether the first packet and the second packet are the same.

Optionally, the method further includes running a discovery protocol at the network device.

Optionally, the discovery protocol comprises a CDP or a LLDP.

Optionally, the network device comprises a single network appliance.

Optionally, the network device comprises multiple network appliances.

A network device includes: one or more ports for tapping to a network, the network comprising a routing device; and a processing unit configured for determining a first information regarding an input interface of the routing device for a packet; determining a second information regarding an output interface of the routing device for the packet; determining whether the packet belongs to a user-defined category based on one or more mapping formation defined at the network device; and associating the packet, the first information regarding the input interface of the routing device, the second information regarding the output interface of the routing device, and information regarding the user-defined category, with each other; and a non-transitory medium for storing the packet, the first information regarding the input interface of the routing device, the second information regarding the output interface of the routing device, and information regarding the user-defined category in association with each other.

Optionally, the network device further includes a plurality of network ports configured to communicate with the network, and a plurality of instrument ports configured to communicate with respective network monitoring instruments.

Optionally, the user-defined category is defined for a subscriber of the network device.

Optionally, the non-transitory medium comprises one or more data center.

Optionally, the processing unit is configured for determining the first information regarding the input interface of the routing device by: receiving a first packet tapped from the network; and determining the first information based on a destination address of the first packet.

Optionally, the processing unit is configured for determining the first information based on the destination address of the first packet by comparing the destination address of the first packet with a source address of a discovery protocol packet.

Optionally, the processing unit is configured for determining the second information regarding the output interface of the routing device by: receiving a second packet tapped from the network; and determining the second information based on a source address of the second packet.

Optionally, the processing unit is configured for determining the second information based on the source address of the second packet by comparing the source address of the second packet with a destination address of a discovery protocol packet.

Optionally, the processing unit is further configured for: determining a first CRC for the first packet; determining a second CRC for the second packet; and comparing the first CRC with the second CRC at the network device to determine whether the first packet and the second packet are the same.

Optionally, the processing unit is further configured for running a discovery protocol.

Optionally, the discovery protocol comprises a CDP or a LLDP.

Optionally, the network device comprises a single network appliance.

Optionally, the network device comprises multiple network appliances.

A method performed by a network device that taps to a network having a routing device, includes: receiving a first packet tapped from the network; determining a first information regarding an input interface of the routing device based on a destination address of the first packet, wherein the first information is determined using a processing unit; receiving a second packet tapped from the network; determining a second information regarding an output interface of the routing device based on a source address of the second packet, wherein the second information is determined using the processing unit; determining a first CRC for the first packet; determining a second CRC for the second packet; and comparing the first CRC with the second CRC at the network device to determine whether the first packet and the second packet are the same.

Optionally, the act of determining the first information or the act of determining the second information comprises determining discovery data contained in a discovery protocol packet.

Optionally, the act of determining the first information regarding the input interface of the routing device comprises comparing the destination address of the first packet with a source address of a discovery protocol packet.

Optionally, the act of determining the second information regarding the output interface of the routing device comprises comparing the source address of the second packet with a destination address of a discovery protocol packet.

Optionally, the destination address of the first packet comprises a destination MAC address, and the source address of the second packet comprises a source MAC address.

Optionally, the method further includes running a discovery protocol at the network device.

Optionally, the discovery protocol comprises a Cisco Discovery Protocol (CDP) or a Link Layer Discovery Protocol (LLDP).

Optionally, the first CRC is determined using at least a portion of the first packet. For example, the first CRC may be determined using a portion of the packet that does not change as the packet traverses the routing device.

Optionally, the method further includes dropping the first packet or the second packet if the first CRC and the second CRC are the same.

Optionally, the method further includes storing the first packet or the second packet in a non-transitory medium.

Optionally, the first packet or the second packet is stored in association with the determined first information regarding the input interface of the routing device, and in association with the determined second information regarding the output interface of the routing device.

Optionally, the network device comprises a single network appliance.

Optionally, the network device comprises multiple network appliances.

A network device includes: one or more ports for receiving a first packet tapped from a network and a second packet tapped from the network, the network comprising a routing device; and a processing unit configured for determining a first information regarding an input interface of the routing device based on a destination address of the first packet; determining a second information regarding an output interface of the routing device based on a source address of the second packet; determining a first CRC for the first packet; determining a second CRC for the second packet; and comparing the first CRC with the second CRC at the network device to determine whether the first packet and the second packet are the same.

Optionally, the processing unit is configured for determining the first information or the second information by determining discovery data contained in a discovery protocol packet.

Optionally, the processing unit is configured for determining the first information regarding the input interface of the routing device by comparing the destination address of the first packet with a source address of a discovery protocol packet.

Optionally, the processing unit is configured for determining the second information regarding the output interface of the routing device by comparing the source address of the second packet with a destination address of a discovery protocol packet.

Optionally, the destination address of the first packet comprises a destination MAC address, and the source address of the second packet comprises a source MAC address.

Optionally, the processing unit is further configured for running a discovery protocol.

Optionally, the discovery protocol comprises a CDP or a LLDP.

Optionally, the processing unit is further configured for determining the first CRC using at least a portion of the first packet.

Optionally, the processing unit is further configured for dropping the first packet or the second packet if the first CRC and the second CRC are the same.

Optionally, the network device further includes a non-transitory medium for storing the first packet or the second packet.

Optionally, the first packet or the second packet is stored in the non-transitory medium in association with the determined first information regarding the input interface of the routing device, and in association with the determined second information regarding the output interface of the routing device.

Optionally, the network device comprises a single network appliance.

Optionally, the network device comprises multiple network appliances.

A method performed by a network device that taps to a network having one or more network equipment, includes: receiving a first packet tapped from the network, wherein the first packet is received at a first network port of the network device; determining a first identity of a first network equipment associated with the first packet by a processing unit based on a discovery protocol; associating the first identity of the first network equipment with a first identity of the first network port of the network device at which the first packet is received, wherein the act of associating is performed by the processing unit; and storing the first identity of the first network equipment and the first identity of the first network port in a non-transitory medium in association with each other.

Optionally, the method further includes determining a second identity of a second network equipment by the processing unit based on the discovery protocol.

Optionally, the first network equipment is associated with the first network port, and the second network equipment is associated with a second network port at the network device, and the method further comprises storing the second identity of the second network equipment and the second identity of the second network port in the non-transitory medium in association with each other.

Optionally, the second network equipment is associated with the first network port, and the method further comprises: storing the second identity of the second network equipment and the first identity of the first network port in the non-transitory medium in association with each other.

Optionally, the method further includes: maintaining a list of network equipment that includes the first network equipment; and presenting a network topology to a user that includes the list of network equipment.

Optionally, the method further includes: determining by the processing unit whether there has been a change in a list of network equipment that includes the first network equipment; and generating a message to inform a user if there has been a change in the list of the network equipment.

Optionally, the message is generated automatically in response to the change in the list of the network equipment.

Optionally, the network device comprises one or more additional network ports configured to communicate with the network, and a plurality of instrument ports configured to communicate with one or more network monitoring instruments, one or more databases, or a combination of both.

Optionally, the non-transitory medium comprises one or more data center.

Optionally, the method further includes: determining a first information regarding an input interface of the first network equipment by the processing unit of the network device; and determining a second information regarding an output interface of the first network equipment by the processing unit.

Optionally, the act of determining the first information regarding the input interface of the first network equipment comprises determining the first information based on a destination address of the first packet.

Optionally, the act of determining the first information based on the destination address of the first packet comprises comparing the destination address of the first packet with a source address of a discovery protocol packet.

Optionally, the act of determining the second information regarding the output interface of the first network equipment comprises: receiving a second packet tapped from the network; and determining the second information based on a source address of the second packet.

Optionally, the act of determining the second information based on the source address of the second packet comprises comparing the source address of the second packet with a destination address of a discovery protocol packet.

Optionally, the method further includes: determining a first CRC for the first packet; determining a second CRC for the second packet; and comparing the first CRC with the second CRC at the network device to determine whether the first packet and the second packet are the same.

Optionally, the discovery protocol comprises a CDP or a LLDP.

Optionally, the network device comprises a single network appliance or multiple network appliances.

A network device includes: one or more ports for tapping to a network; and a processing unit configured for receiving a first packet tapped from the network, wherein the first packet is received at a first network port of the network device; determining a first identity of a first network equipment associated with the first packet based on a discovery protocol; and associating the first identity of the first network equipment with a first identity of the first network port of the network device at which the first packet is received; and a non-transitory medium for storing the first identity of the first network equipment and the first identity of the first network port in association with each other.

Optionally, the processing unit is further configured for determining a second identity of a second network equipment based on the discovery protocol.

Optionally, the first network equipment is associated with the first network port, and the second network equipment is associated with a second network port at the network device, and the non-transitory medium is configured for storing the second identity of the second network equipment and the second identity of the second network port in association with each other.

Optionally, the second network equipment is associated with the first network port, and the non-transitory medium is configured for storing the second identity of the second network equipment and the first identity of the first network port in association with each other.

Optionally, the processing unit is further configured for: maintaining a list of network equipment that includes the first network equipment; and presenting a network topology to a user that includes the list of network equipment.

Optionally, the processing unit is configured for: determining whether there has been a change in a list of network equipment that includes the first network equipment; and generating a message to inform a user if there has been a change in the list of the network equipment.

Optionally, the processing unit is configured to generate the message automatically in response to the change in the list of the network equipment.

Optionally, the network device further includes one or more additional network ports configured to communicate with the network, and a plurality of instrument ports configured to communicate with one or more network monitoring instruments, one or more databases, or a combination of both.

Optionally, the non-transitory medium comprises one or more data center.

Optionally, the processing unit is further configured for: determining a first information regarding an input interface of the first network equipment; and determining a second information regarding an output interface of the first network equipment.

Optionally, the processing unit is configured for determining the first information regarding the input interface of the first network equipment by determining the first information based on a destination address of the first packet.

Optionally, the processing unit is configured for determining the first information based on the destination address of the first packet by comparing the destination address of the first packet with a source address of a discovery protocol packet.

Optionally, the processing unit is configured for determining the second information regarding the output interface of the first network equipment by: receiving a second packet tapped from the network; and determining the second information based on a source address of the second packet.

Optionally, the processing unit is configured for determining the second information based on the source address of the second packet by comparing the source address of the second packet with a destination address of a discovery protocol packet.

Optionally, the processing unit is further configured for: determining a first CRC for the first packet; determining a second CRC for the second packet; and comparing the first CRC with the second CRC at the network device to determine whether the first packet and the second packet are the same.

Optionally, the discovery protocol comprises a CDP or a LLDP.

Optionally, the network device comprises a single network appliance or multiple network appliances.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
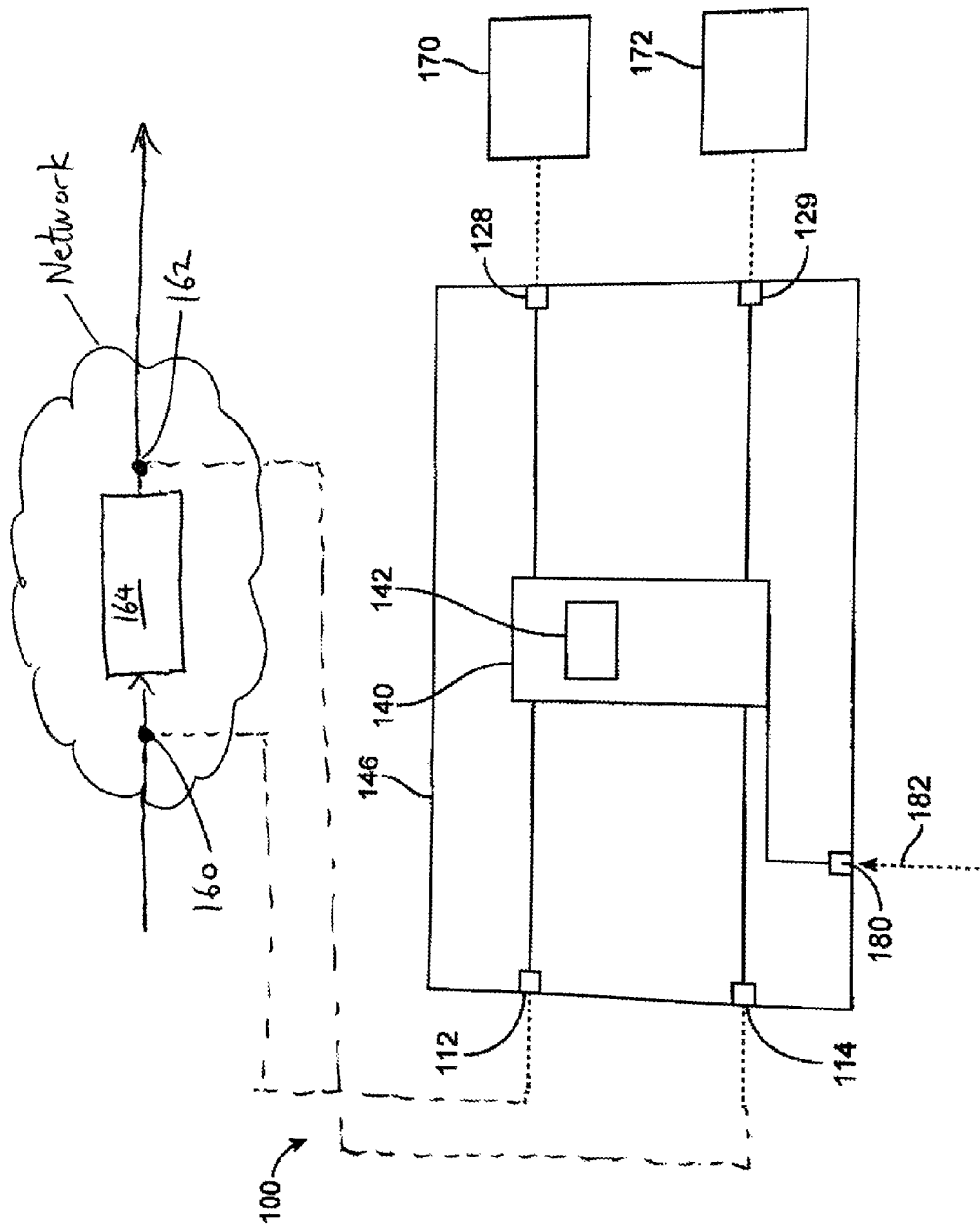
FIG. 1 illustrates a network device in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

FIG. 1 illustrates a network device 100 in accordance with some embodiments. The network device 100 includes a first network port 112, a second network port 114, a first instrument port 128, and a second instrument port 129. The device 100 also includes an integrated circuit 140 with a processing unit 142, and a housing 146 for containing the integrated circuit 140 and the integrated circuit 140. In the illustrated embodiments, the network device 100 also includes other components, such as a Network PHY (not shown) coupled to each of the respective ports 112, 114, wherein the Network PHYs may be considered to be parts of the integrated circuit 140. Alternatively, the Network PHYs may be considered to be components that are separate from the integrated circuit 140. The PHY is configured to connect a link layer device to a physical medium such as an optical fiber, copper cable, etc. In other embodiments, instead of the PHY, the device 100 may include an optical transceiver, or a SERDES, etc. The housing 146 allows the device 100 to be carried, transported, sold, and/or operated as a single unit. The ports 112, 114, 128, 129 are located at a periphery of the housing 146. In other embodiments, the ports 112, 114, 128, 129 may be located at other locations relative to the housing 146. Although two network ports 112, 114 are shown, in other embodiments, the device 100 may include more than two network ports. Also, although two instrument ports 128, 129 are shown, in other embodiments, the device 100 may include only one instrument port, or more than two instrument ports. In addition, in some cases, the network device 100 may not include any instrument ports for communication with network monitoring instruments. Furthermore, in some cases, the instrument ports 128, 129 may be configured to communicate with one or more instruments. The one or more instruments may be one or more network monitoring instruments. In other cases, the one or more instruments may be one or more non-transitory media, such as one or more storage devices, one or more databases, etc.

During use, the first network port 112 of the device 100 is communicatively coupled (e.g., via a network, such as the Internet) to a first node 160, and the second network port 114 is communicatively coupled (e.g., via a network, such as the Internet) to a second node 162. In some embodiments, the network device 100 is configured to receive packets from nodes 160, 162 via the network ports 112, 114. In the illustrated embodiments, the node 160 is at the input interface side of a routing device 164 (such as a router), and the node 162 is at the output interface side of the routing device 164. During use, the network device 100 is configured to tap packet being transmitted to the input interface of the routing device 164, and to tap packet transmitted out of the output interface of the routing device 164. Also, during use, the instrument ports 128, 129 of the device 100 are communicatively coupled to respective instruments 170, 172. The instruments 170, 172 may be directly coupled to the device 100, or communicatively coupled to the device 100 through the network (e.g., Internet). In some cases, the device 100 is provided as a single unit that allows the device 100 to be deployed at a single point along a communication path. In the illustrated embodiments, the network device 100 (e.g., the processing module 142) is configured to receive packets from nodes 160, 162 via the network ports 112, 114, and process the packets in accordance with a predefined scheme. For example, the processing module 142 in the network device 100 may analyze packets received from nodes 160 and/or 162 to determine information (e.g., identity) regarding the input interface of the routing device 164, information (e.g., identity) regarding the output interface of the routing device 164, etc., and pass the determined information downstream for processing. For example, the processing module 142 may pass the determined information for storage in a non-transitory medium. Alternatively, or additionally, the processing module 142 may pass the determined information along with the associated packets received from one or more nodes to one or more instruments that are connected to respective instrument port(s) 128, 129.

In some embodiments, one or more of the network ports 112, 114 may be configured to receive normal packets (e.g., packets not from a virtualized network), as well as virtualized packets (e.g., packets with tunnel format that includes encapsulation of the original packets resulted from virtualization technology). In other embodiments, one or more the network ports 112, 114 may be configured to receive only non-virtualized packets. In further embodiments, one or more the network ports 112, 114 may be configured to receive only virtualized packets.

In one or more embodiments, the integrated circuit 140 may be any switch module that provides packet transmission in accordance with a pre-determined transmission scheme. In some embodiments, the integrated circuit 140 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, a database, etc., or the instrument may be a pass-through device (i.e., it can receive packets, and transmit the packets back to the device 100 after the packets have been processed), such as an intrusion prevention system. In other embodiments, the integrated circuit 140 may be configured such that the packets may be transmitted in a one-to-many configuration (i.e., from one network port to multiple instrument ports). In other embodiments, the integrated circuit 140 may be configured such that the packets may be transmitted in a many-to-many configuration (i.e., from multiple network ports to multiple instrument ports). In further embodiments, the integrated circuit 140 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 100 so that the packets (or certain types of packets) are routed according to any one of these configurations. In some embodiments, the packet movement configuration is predetermined such that when the network device 100 receives the packets, the network device 100 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

In accordance with some embodiments, the integrated circuit 140 may have the functionalities of a conventional packet switch except that it provides visibility into various parts of a network. Thus, embodiments of the integrated circuit 140 may operate like a conventional managed packet switch, but providing packet monitoring function. This is accomplished by configuring the integrated circuit 140 to operate as a circuit switch under certain circumstances. In some embodiments, the configuring of the managed packet switch may be performed by utilizing a CPU interface of the switch to modify appropriate registers in the switch to allow for the desired operation. Also, in some embodiments, the integrated circuit 140 may be an "out-of-band" network switch, which is configured to obtain packets and pass them to an instrument or to a network that is different from that associated with the original intended destination of the packets.

Also, the term "out-of-band" device/switch refers to a device that is not involved in a transmission of a packet (that is transmitted from node 1 and intended for reception by node 2) to the intended receiving node 2. In some cases, a device may be both an in-band device and an out-of-band device with respect to processing different packets. For example, the network device 100 may be an in-band device if it receives a packet (intended for transmission from node 1 to node 2) from a network, and passes the packet back to the network (e.g., after the packet has been processed by a pass-through monitoring tool) for transmission downstream to the node 2. The same network device 100 may also be an out-of-band device if it receives another packet from the network, and does not pass the packet back to the network for transmission to the intended receiving node.

It should be noted that the integrated circuit 140 that may be used with the device 100 is not limited to the examples described above, and that other integrated circuits 140 with different configurations may be used as well. Also, in one or more embodiments described herein, the integrated circuit 140 may be implemented using a processor (e.g., a general purpose processor, a network processor, an ASIC processor, a FPGA processor, etc.).

In other embodiments, the network device 100 may optionally include an additional processing unit (e.g., a processor) communicatively coupled to the processing unit 142. The additional processing unit may be used to perform additional packet processing, such as header stripping, in some embodiments. For example, in some embodiments, the additional processing unit may be configured to receive only packets with a tunnel format, such as that used in a virtualized network. In one implementation, the processing unit 142 or the integrated circuit 140 is configured to pass all packets with a tunnel format to the additional processing unit, and does not pass packets without any tunnel format (e.g., packets that are not associated with a virtualized network) to the additional processing unit. Upon receiving a packet with a tunnel format, the additional processing unit then removes one or more headers from the packet. By means of non-limiting examples, the additional processing unit may be configured to remove an outer MAC header, an outer IP header, an outer UDP header, or any combination of the foregoing, from the packet. In some embodiments, after the additional processing unit performs header stripping on the packet, the additional processing unit then passes the packet back to the integrated circuit 140. The integrated circuit 140 then transmits the packet to one or more of the instrument ports 128, 129 according to a pre-determined transmission scheme (e.g., one-to-one, one-to-many, many-to-one, many-to-many, etc.) as discussed previously. In other embodiments, in addition to performing packet stripping, the additional processing unit may also be configured to perform other packet processing functions on the received packet. In some embodiments, the additional processing unit may be located outside the housing of the network device 100. In other embodiments, the additional processing unit may be a part of the integrated circuit 140. For example, the additional processing unit may be considered to be a part of the processing unit 142. Also, in some embodiments, the additional processing unit may be a general purpose processor, a network processor, an ASIC processor, a FPGA processor, or any of other types of processor. In other embodiments, the additional processing unit may be any hardware, software, or combination thereof.

In the illustrated embodiments, the processing unit 142 is illustrated as a component of the integrated circuit 140. In some cases, the processing unit 142 may be one or more processors in the integrated circuit 140. In other cases, the processing unit 142 may be one or more circuit components that are parts of the integrated circuit 140. In other embodiments, the processing unit 142 may be a separate component from the integrated circuit 140. The processing unit 142 may be implemented using a processor, such as a general processor, a network processor, an ASIC processor, a FPGA processor, etc. In other embodiments, the processing unit 142 may be a field processor. In further embodiments, the processing unit 142 may be a network card. The processing unit 142 may be implemented using one or more processors, wherein one or more of the processors may be considered to be a part of the network device 100 or not. Also, in some embodiments, the integrated circuit 140 may include ternary content-addressable memory (TCAM). The integrated circuit 140 may be configured to perform various packet processing functions, included but not limited to packet filtering, packet routing, packet switching, packet mirroring, packet aggregation, etc.

As shown in the figure, the network device 100 further includes a port 180 for receiving configuration information 182 to thereby configure the integrated circuit 140 (e.g., the processing unit 142 in the packet switch). In some embodiments, the port 180 may be a separate and different port from the network ports 112, 114. In other embodiments, the port 180 may be a network port, like the network ports 112, 114, or may be implemented using one or both of the network ports 112, 114. In such cases, in addition to receiving the information 182, the port 180 may also receive network traffic that are being communicated between nodes (e.g., nodes 160, 162). Also, in further embodiments, the device 100 may include multiple ports 180 for receiving configuration information 182. In some cases, one or more of the ports 180 may be used to implement the network ports 112, 114, thereby allowing the same port(s) 180 for receiving the configuration information 182 to also receive network traffic.

In some embodiments, the network device 100 may be configured to sample all (i.e., 100%) of the packets for a certain network flow. For example, the network device 100 may sample all of the packets for 1 flow out of every N network flows. Such feature is advantageous because the entire traffic analysis for a given flow will be accurate and reliable. Thus, the intelligence of overall network monitoring and security performance for the entire network may be inferred based upon the fully detected network monitoring and security performance for the subset or sample of the flows on the network. In other cases, the network device 100 may be configured to sample a subset of the packets for a certain network flow.

Figure 2:
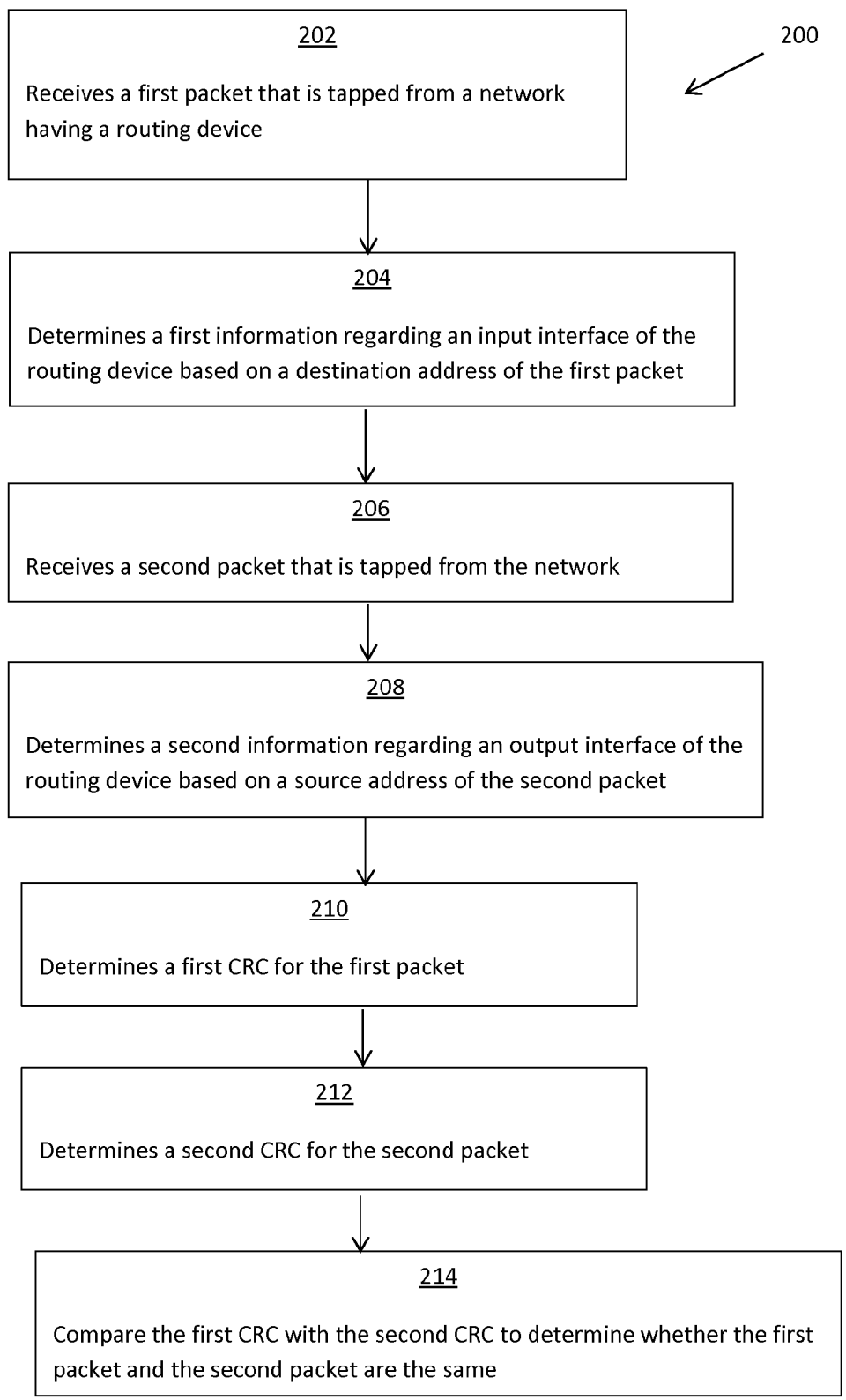
FIG. 2 illustrates a method performed by a network device.

FIG. 2 illustrates a method 200 performed by the network device 100 of FIG. 1 in accordance with some embodiments. In other embodiments, the method 200 may be performed by other types of network devices, or other devices having different configurations as those described with reference to FIG. 1.

First the network device 100 receives a first packet that is tapped from a network having a routing device 164 (item 202). As used in this specification, the term "routing device" may refer to any device that has routing capability, such as a routing, a switch, etc. Also, as used in this specification, the term "tap" or similar term, such as "tapped", may refer to the act of receiving a copy of a packet from a network, wherein such act may be performed by any device (which may or may not be considered a "tap"). In some cases, the act of receiving the first packet may be performed by the processing unit 142, which is configured to receive the first packet. In other cases, the act of receiving the first packet may be performed by another processing unit at the network device 100. Also, in some cases, the act of receiving the first packet may be performed by a network port (e.g., network port 112) at the network device 100. After the first packet is received by the network port 112, the network port 112 then passes the first packet downstream to another component in the network device 100 for processing.

Next, the network device 100 determines a first information regarding an input interface of the routing device 164 based on a destination address of the first packet (item 204). In some cases, the act of determining the first information regarding the input interface of the routing device 164 may be performed by the processing unit 142, which is configured to determine the first information. In other cases, the act of determining the first information regarding the input interface of the routing device 164 may be performed by another processing unit at the network device 10.

In some embodiments, the act of determining the first information regarding the input interface of the routing device 164 may comprise comparing the destination address (e.g., a destination MAC address) of the first packet with a source address of a discovery protocol packet. For example, the network device 100 may run a discovery protocol. By means of non-limiting examples, the discovery protocol may be a Cisco Discovery Protocol (CDP), a Link Layer Discovery Protocol (LLDP), etc. Accordingly, the discovery protocol packet may be a CDP packet, a LLDP packet, etc. In one implementation, a discovery protocol (e.g., CDP, LLDP, etc.) may be run for the network port 112 that receives the first packet, which corresponds with a discovery protocol that is run at the input interface of the routing device 164 in the network. As the network port of the network device 100 receives packets tapped from the input side of the routing device 164, the packets and/or information regarding the packets are stored in a discovery protocol database (e.g., a non-transitory medium in the network device 100 or in communication with the network device 100). The above technique allows the network device 100 to know information (e.g., name of input interface at the routing device 164) regarding the routing device 164 from which the packet was tapped.

The network device 100 also receives a second packet tapped from the network (item 206). In some cases, the act of receiving the second packet may be performed by the processing unit 142, which is configured to receive the second packet. In other cases, the act of receiving the second packet may be performed by another processing unit at the network device 10. Also, in some cases, the act of receiving the second packet may be performed by a network port (e.g., network port 114) at the network device 10. After the second packet is received by the network port 114, the network port 114 then passes the second packet downstream to another component in the network device 100 for processing.

Also, in some cases, the first packet and the second packet may be received by the same network port at the network device 100. In other cases, the first packet and the second packet may be received by different respective network ports at the network device 100.

Next, the network device 100 determines a second information regarding an output interface of the routing device 164 based on a source address of the second packet (item 208). In some cases, the act of determining the second information regarding the output interface of the routing device 164 may be performed by the processing unit 142, which is configured to determine the second information. In other cases, the act of determining the second information regarding the output interface of the routing device 164 may be performed by another processing unit at the network device 100.

In some embodiments, the act of determining the second information regarding the output interface of the routing device 164 comprises comparing the source address (e.g., a source MAC address) of the second packet with a destination address of a discovery protocol packet. For example, as similarly discussed, the network device 100 may run a discovery protocol. By means of non-limiting examples, the discovery protocol may be a CDP protocol, a LLDP protocol, etc. Accordingly, the discovery protocol packet may be a CDP packet, a LLDP packet, etc. In one implementation, a discovery protocol (e.g., CDP, LLDP, etc.) may be run for the network port 114 that receives the second packet, which corresponds with a discovery protocol that is run at the output interface of the routing device 164 in the network. As the network port 114 of the network device 100 receives packets tapped from the input side of the routing device 164, the packets and/or information regarding the packets is stored in a discovery protocol database (e.g., a non-transitory medium in the network device 100 or in communication with the network device 100). The above technique allows the network device 100 to know information (e.g., name of output interface at the routing device 164) regarding the routing device 164 from which the packet was tapped.

As illustrated in items 202-208 discussed above, the technique to compare the source and destination MAC addresses with discovery protocol information is advantageous because it allows the network device 100 to determine the direction of the packet with respect to the routing device 164 (e.g., whether the tapped packet is going to the input interface of the routing device 164, or exited from the output interface of the routing device 164). The above technique is also advantageous because it allows the network device 100 to determine such information without requiring the routing device 164 to support a new protocol. The above technique also allows routing points to be determined without physically tracing a wire.

Next, the network device 100 determines a first CRC for the first packet (item 210), and determines a second CRC for the second packet (item 212). In some cases, the act of determining the first CRC and the act of determining the second CRC may be performed by the processing unit 142. In other cases, the act of determining the first CRC and the act of determining the second CRC may be performed by another processing unit at the network device 100.

Next, the network device 100 compares the first CRC with the second CRC at the network device to determine whether the first packet and the second packet are the same (item 214). In some cases, the first CRC may be determined using at least a portion of the first packet, e.g., a portion of the first packet corresponding with a portion of the original packet that does not change between the input interface of the routing device 164 and the output interface of the routing device 164. In one implementation, the first CRC may be determined using a portion of the packet that is from the transport layer or above. Similarly, in some cases, the second CRC may be determined using at least a portion of the second packet, e.g., a portion of the second packet corresponding with a portion of the original packet that does not change between the input interface of the routing device 164 and the output interface of the routing device 164. In one implementation, the second CRC may be determined using a portion of the packet that is from the transport layer or above.

In some embodiments, the method 200 may further include dropping the first packet or the second packet if the first CRC and the second CRC are the same. In particular, because the network device 100 receives two copies of the original packet that goes through the routing device 164 (i.e., one copy corresponds with the input interface of the routing device 164, and another copy corresponds with the output interface of the routing device 164), it may be desirable to keep only one copy for further processing. Accordingly, if the first CRC and the second CRC are the same, the processing unit 142 may then determine that the first packet and the second packet are copies of the same packet.

In some cases, the network device 100 (e.g., the processing module 142 in the network device 100) may be configured to pass the determined information (e.g., information regarding the input interface and output interface of the routing device 164) to one or more network monitoring instruments 170, 172 via one or more instrument ports 128, 129 for processing. Also, in some embodiments, the processing module 142 may configure the network device 100 based on the determined information. For example, the processing module 142 may be configured to change a mapping stored in the network device 100 that involves information regarding the input and output interfaces of the routing device 164. In further embodiments, the processing module 142 may be configured to determine which instrument port(s) 170, 172 to pass packets based on the determined information regarding the input and output interfaces of the routing device 164.

Also, in some embodiments, the method 200 may further include storing the first packet or the second packet in a non-transitory medium. The non-transitory medium may be in the network device 100 or may be in communication with the network device 100. For example, the non-transitory medium storing the first packet or the second packet may be one or more databases, such as one or more datacenters. In addition, in some embodiments, the first packet or the second packet may be stored in association with the determined first information regarding the input interface of the routing device 164, and in association with the determined second information regarding the output interface of the routing device 164.

It should be noted that the method 200 is not limited to the order of the items 202-214 described previously, and that the order of the items 202-214 may be different in different embodiments. For example, in other cases, items 202, 206 may be performed first before items 204, 208 are performed. Also, in other cases, items 204, 208 may be performed simultaneously. In other items, item 208 may be performed before item 204. In further cases, items 210, 212, 214 may be performed before items 204, 208, or in parallel with items 204, 208.

In the above embodiments, the network device 100 is illustrated as having instrument ports 128, 129 for outputting packets to respective network monitoring instruments 170, 172. In other embodiments, the network device 100 may have only one instrument port for communication with only one network monitoring instrument.

Also, in some embodiments, the integrated circuit 140 may be a specialized integrated circuit configured to perform various functions described herein. In addition, in some embodiments, the processing unit 142 may be a specialized processing unit configured to perform various functions described herein. The processing unit 142 and the integrated circuit 140 improve existing technology. For example, the processing unit 142 and/or the integrated circuit 140 may allow network device communicating with network monitoring tools to determine input interface and/or output interface of routing devices, that was not possible previously.

Figure 3:
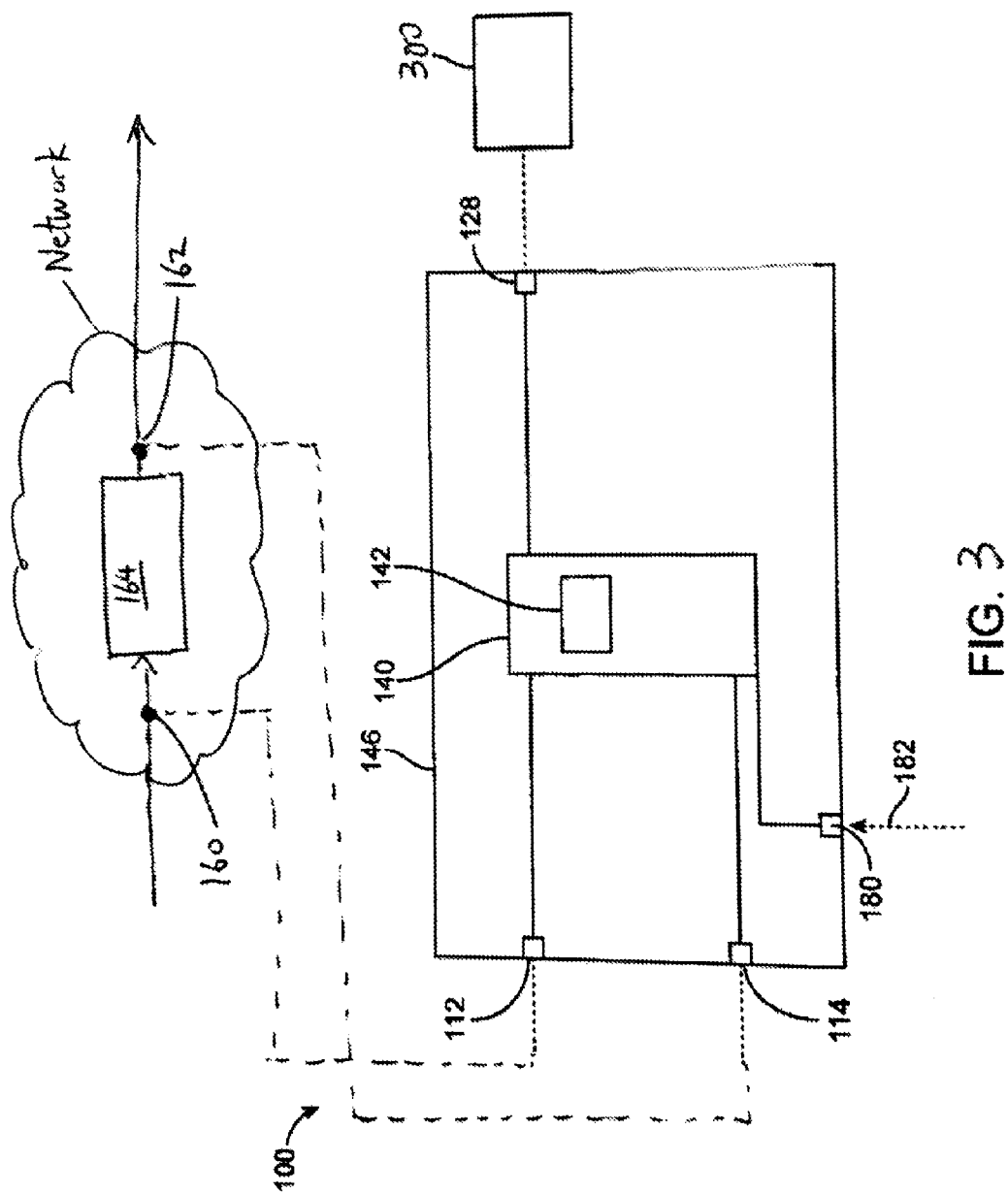
FIG. 3 illustrates another network device in accordance with other embodiments.

Also, in other embodiments, one or more instrument ports may be configured to communicate with one or more non-transitory medium. FIG. 3 illustrates another network device 100 in accordance with other embodiments. The network device 100 of FIG. 3 is the same as the network device of FIG. 1, except that the network device 100 of FIG. 3 has an instrument port for communication with a storage system 300. The storage system 300 may include one or more non-transitory media, such as one or more storage devices, one or more databases, etc. In other embodiments, instead of one instrument port for communication with the storage system 300, the network device 100 may have multiple instrument ports for communication with respective storage systems. The network device of FIG. 3 may be configured to perform the method 200 described with reference to FIG. 2.

In the above embodiments, the network device 100 has been described as being configured to determine information (e.g., packets and/or associated data regarding the input and output interfaces of the routing device 164 through which the packets pass) for transmission downstream to one or more network monitoring instrument, and/or for determining which instrument port(s) to pass packets to network monitoring instrument(s). In other embodiments, instead of using the determined information regarding the input and output interfaces of the routing device 164 in a process that involves network monitoring instrument(s), the network device 100 may be configured to organize data stored in a datacenter into different user-defined categories.

Figure 4:
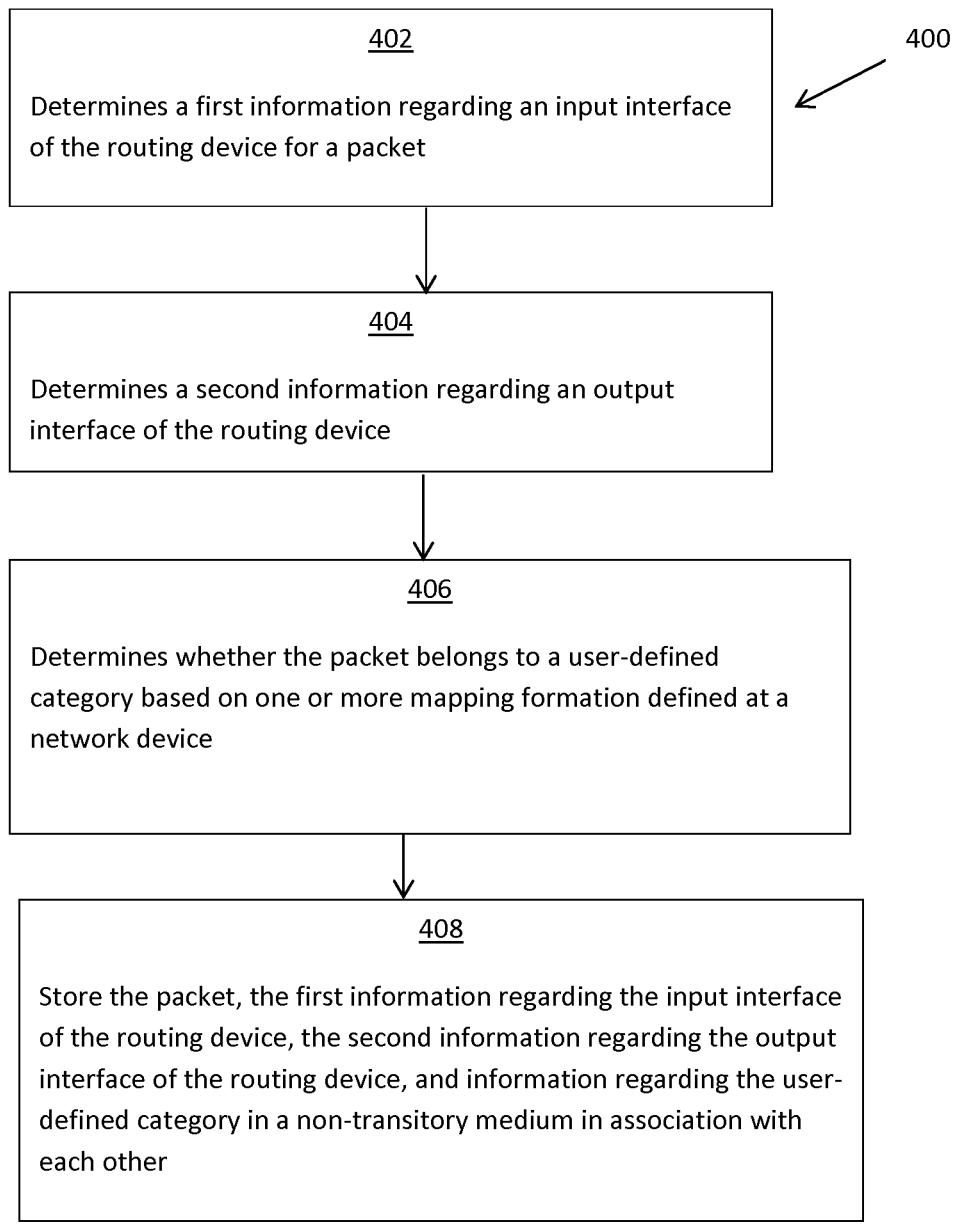
FIG. 4 illustrates another method performed by a network device.

FIG. 4 illustrates a method 400 performed by the network device 100 of FIG. 1 or FIG. 3 in accordance with some embodiments. In some cases, the method 400 may be performed by the network device 100 to organize (e.g., group) data in a datacenter into one or more user-defined categories. In other embodiments, the method 400 may be performed by other types of network devices, or other devices having different configurations as those described with reference to FIG. 1 and FIG. 3. In some cases, the method 400 may be performed by a network device that taps to a network having a routing device.

First, the network device 100 determines a first information regarding an input interface of the routing device 164 for a packet (item 402). In some cases, the act of determining the first information may be performed by the processing unit 142. In other cases, the act of determining the first information may be performed by another processing unit at the network device 100.

In some cases, the act of determining the first information regarding the input interface of the routing device 164 may be achieved using a similar technique described with reference to the method 200. In particular, in some embodiments, the act of determining the first information regarding the input interface of the routing device 164 may include: receiving a first packet tapped from the network, and determining the first information based on a destination address of the first packet. In some cases, the act of determining the first information based on the destination address of the first packet may include comparing the destination address of the first packet with a source address of a discovery protocol packet. For example, the network device 100 may run a discovery protocol. By means of non-limiting examples, the discovery protocol may be a CDP, a LLDP, etc. Accordingly, the discovery protocol packet may be a CDP packet, a LLDP packet, etc. In one implementation, a discovery protocol (e.g., CDP, LLDP, etc.) may be run for the network port that receives the first packet, which corresponds with a discovery protocol that is run at the input interface of the routing device 164 in the network. As the network port of the network device 100 receives packets tapped from the input side of the routing device 164, the packets and/or information regarding the packets are stored in a discovery protocol database (e.g., a non-transitory medium in the network device 100 or in communication with the network device 100). The above technique allows the network device 100 to know information (e.g., name of input interface at the routing device 164) regarding the routing device 164 from which the packet was tapped.

In other cases, the act of determining the first information regarding the input interface of the routing device 164 may be achieved using other techniques.

The network device 100 also determines a second information regarding an output interface of the routing device 164 for the packet (item 404). In some cases, the act of determining the second information may be performed by the processing unit 142. In other cases, the act of determining the second information may be performed by another processing unit at the network device 100.

In some cases, the act of determining the second information regarding the output interface of the routing device 164 may be achieved using a similar technique described with reference to the method 200. In particular, in some embodiments, the act of determining the second information regarding the output interface of the routing device 164 may include: receiving a second packet tapped from the network, and determining the second information based on a source address of the second packet. In some cases, the act of determining the second information based on the source address of the second packet may include comparing the source address of the second packet with a destination address of a discovery protocol packet. For example, the network device 100 may run a discovery protocol. By means of non-limiting examples, the discovery protocol may be a CDP, a LLDP, etc. Accordingly, the discovery protocol packet may be a CDP packet, a LLDP packet, etc. In one implementation, a discovery protocol (e.g., CDP, LLDP, etc.) may be run for the network port that receives the second packet, which corresponds with a discovery protocol that is run at the output interface of the routing device in the network. As the network port of the network device 100 receives packets tapped from the output side of the routing device 164, the packets and/or information regarding the packets are stored in a discovery protocol database (e.g., a non-transitory medium in the network device 100 or in communication with the network device 100). The above technique allows the network device 100 to know information (e.g., name of output interface at the routing device) regarding the routing device that outputs the original packet.

In other cases, the act of determining the second information regarding the output interface of the routing device may be achieved using other techniques.

The network device 100 also determines whether the packet belongs to a user-defined category based on one or more mapping formation defined at the network device 100 (item 406). In some embodiments, the network device 100 may store processing information, such as instruction, mapping, filtering parameters, etc., that prescribe how packets received at the network ports 112, 114 of the network device 100 are to be processed (e.g., grouped, passed downstream to one or more instrument ports, etc.) for different subscribers of the network device 100. In some cases, the processing information may be input to the network device 100 via port 180. Accordingly, there may be different user-defined categories for different subscribers of the network device 100. It should be noted that as used in this specification, the term "subscriber" may refer to any person, group of persons, an entity (e.g., an organization, a company, etc.), etc., that directly or indirectly uses one or more function provided by the network device 100. In some cases, the processing unit 142 or another processing unit in the network device 100 may use the processing information stored in the network device 100 to determine whether the packet belongs to a certain user-defined category or not. For example, the processing information may indicate that packets with a certain source address, a certain destination address, and/or other field information, are to be processed in a certain way (e.g., to be passed to a certain network monitoring instrument or certain prescribed database), and so they belong to the same user-defined category.

Next, the packet, the first information regarding the input interface of the routing device 164, the second information regarding the output interface of the routing device 164, and information regarding the user-defined category may be stored in a non-transitory medium in association with each other (item 408). In some cases, the non-transitory medium may be in the network device 100. In other cases, the non-transitory medium may be outside the network device 100 in communication with the network device 100 (such as the storage system 300). Also, in some cases, the non-transitory medium may include a single storage device. In other cases, the non-transitory medium may include multiple storage devices. Furthermore, in some cases, the non-transitory medium may comprise one or more data center.

Also, in some embodiments in which the network device 100 include multiple instrument ports for communication with respective non-transitory media, the method 400 may further include determining which instrument port(s) for outputting the determined information for storing the determined information. For example, the processing unit 142 may utilizes one or more mapping information stored in the network device 100 that maps certain types of packets to certain instrument port(s). In such cases, when the processing unit 142 has identified certain type of packets (e.g., packets that belong to certain user-defined category), the processing unit 142 then determines the instrument port(s) for outputting the packets and/or the information determined in association with the packets. In some cases, there may be one storage system 300 in communication with an instrument port at the network device 100 for a certain subscriber, and another storage system 300 in communication with another instrument port at the network device 100 for another subscriber. The mapping information allows certain packets be routed to a storage system 300 for a certain subscriber, and certain other packets be routed to another storage system 300 for another subscriber.

In some cases, the method 400 may further include: determining a first CRC for the first packet; determining a second CRC for the second packet; and comparing the first CRC with the second CRC at the network device to determine whether the first packet and the second packet are the same. If the first and second packets are the same, then the processing unit 142 may determine that the first and second packets include respective portions (e.g., the payload portions) that are copies of the original packet portion. The original packet going to the input interface of the routing device 164 in the network and exiting from the output interface of the routing device 164 may result in two copies of the packet when the packet is tapped from the input interface side of the routing device 164 and is tapped again from the input interface side of the routing device 164. The two copies of the packet may have the same payload, but different source and destination addresses. The above technique allows the network device 100 to identify two packets that are copies of the same original packet, but are respectively tapped from the input interface side and the output interface side of the routing device 164. In some cases, the processing unit 142 of the network device 100 may be configured to drop one of the two copies of the packet after the first and second packets have been determined to be copies of the original packet. Also, in some cases, in item 408, the first information regarding the input interface of the routing device, the second information regarding the output interface of the routing device, and information regarding the user-defined category may be stored in a non-transitory medium in association with each other, and also in association with only one copy of the original packet after the other copy of the packet is dropped. In addition, in some cases, the only one copy of the packet may be stored in the non-transitory medium.

In some cases, the method 400 may be performed for a datacenter, which stores packets and/or information regarding the packets, such as the input and output interfaces of the routing device 164. In such cases, the determined information regarding the user-defined category may be used to organize stored information in the datacenter into different categories in accordance with the user-defined categories. For example, a subscriber of the network device 100 may be interested in a first set of data stored in the datacenter, while another subscriber may be interested in a second set of data stored in the datacenter that is different from the first set. The method 400 allows different data in the datacenter be associated with different user-defined categories by storing the information regarding the user-defined categories in association with the different data in the datacenter.

It should be noted that the method 400 is not limited to the order of the items 402-408 described previously, and that the order of the items 402-408 may be different in different embodiments. For example, in other cases, item 406 may be performed before items 402, 404, or in parallel with items 402 and/or 404. Also, in other cases, items 404 may be performed before item 402, or in parallel with item 402.

In some embodiments, the processing unit 142 in the network device 100 of FIG. 1/FIG. 3 may be a specialized processing unit configured to perform one or more functions described herein. For example, in some embodiments, the processing unit 142 may be configured to determine information regarding an input interface of the routing device 164, to determine information regarding an output interface of the routing device 164, to determine CRCs for respective packets and to compare the CRCs to determine whether the packets are duplicate copies, to determine whether to drop one or more packets, to determine which instrument ports to output information, to determine whether one or more packets belong to a user-defined category, or any combination of the foregoing.

In other embodiments, the processing unit 142 may be configured to process all discovery packets obtained through the discovery protocol, and determine the associated data between the network equipment (e.g., routing device 164, etc.) that are being monitoring, and the network ports at the network device 100 that are communicating with these network equipment being monitored. The discovery packets and the associated data may be stored in a non-transitory medium (e.g., a database) that is either in the network device 100, or is communicating with a network device 100. The data in the non-transitory medium may be used to identify network equipment identity for reporting, association, and other applications.

Also, in some embodiments, a user interface may be provided to display the discovery data in a format in a way that allows users to see which network equipment (e.g., routing devices, such as routing device 164) are attached to the network device 100. The user interface may be a graphical user interface (GUI), a command line interface (CLI), or any of other types of user interface.

For example, the processing unit 142 may associate the identities of the various network equipment with the network device(s) 100 that they are communicating with. The processing unit 142 may also associate the identities of the network ports at the network device(s) 100 with the network equipment they are communicating with. When a user requests for such information, the identities of the network equipment, the associated device(s)100, and the associated network ports are then retrieved and be displayed (e.g., by a user interface module) in association with each other for presentation to the user. For example, the user interface may display a graph, a table, a chart, or any of other types of graphics, to indicate the association between (1) the discovery data and (2) the corresponding network equipment (e.g., routing device 164) that is communicating with a certain network port of the network device 100 either directly or indirectly.

In some cases, the processing unit 142 may include a user-interface module that is configured to generate information for display on a screen. The user-interface module may generate the information in response to a command entered by a user. For example, the user may enter a request for a list of network equipment that are communicating with the network device 100 (either directly or indirectly) through a certain network ports. In another example, the user may enter a request for a network topology based on certain discovery data. In further example, the user may enter a request for a list of network equipment that has been changed from the previous network topology. In response to any of the above requests, the processing unit 142 (e.g., the user-interface module therein) may then retrieve the relevant information from a non-transitory medium, processes them, and then transmits the information for display on a screen. The non-transitory medium may be in the network device 100, or may be external to the network device 100 that is communicating with the non-transitory medium.

In addition, in some embodiments, the processing unit 142 may determine or detect network topology from the discovery data, and the user interface may display a graphic representing the network topology so that the user can see the network being monitored. For example, the processing unit 142 may be configured to maintain a list of network equipment communicating with the network device 100 based on the discovery data obtained through the discovery protocol. In one implementation, the processing unit 142 may have an equipment inventory engine that maintains such list. In some cases, the list of network equipment may be organized based on different network ports in the network device 100. For example, there may be a list of four network equipment NE1, NE2, NE3, NE4 that are communicating with the network device 100 through network port NP1. Also, there may be a list of two network equipment NE5, NE6 that are communicating with the network device 100 through network port NP2. In such cases, if a list of network equipment changes (e.g., due to adding of a new network equipment, absence of a network equipment, etc.) for a certain network port, the processing unit 142 may inform a user of the change. For example, the processing unit 142 may automatically send a message to the user, or alternatively, may send such message in response to a user's request to identify any change in the list. In some cases, the absence of a network equipment in the list may indicate that there is an equipment problem with the network equipment. Also, in some cases, an addition of a new network equipment may be done without the knowledge of a user (e.g., through a mistake by another user). Thus, the above features are advantageous because they will allow the user to know of any changes to a list of network equipment for a certain network port(s) (that may be assigned to a certain user).

It should be noted that the data stored in the non-transitory medium are not limited to the examples of use described above, and that the stored data may be used for other purposes in other embodiments. For example, in other embodiments, the processing unit 142 may have a bandwidth utilization module configured to determine bandwidth utilization for a port that taps between two routing points, etc.

Figure 5:
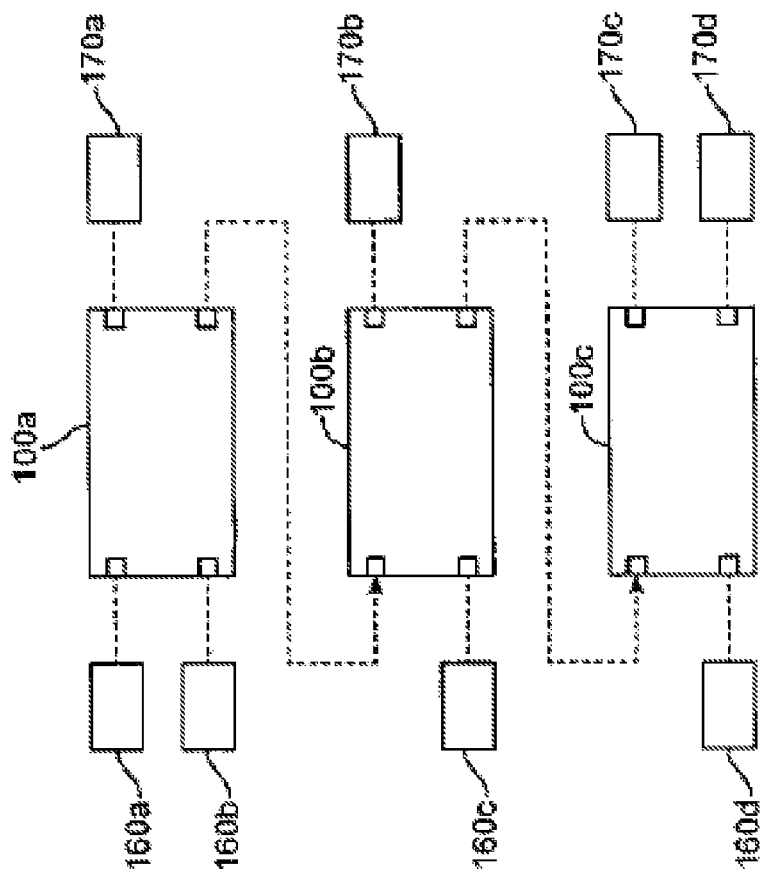
FIG. 5 illustrates a network switch appliance in a stacked configuration with one or more additional network switch appliance(s) in accordance with some embodiments.

In the above example, the network device 100 has been illustrated as a single network appliance. In other embodiments, the network device may comprise a multiple network appliances. Thus, as used in this specification, the term "device" may refer to a single appliance/component, or to a plurality of appliances/components that are connected or communicatively coupled together. For example, in other embodiments, the method 200 may be performed by a plurality of network switch devices 100 that are stacked together. Also, in some embodiments, any of the above features that is described as being performed by the network switch device may alternatively be performed by a plurality of network switch devices 100 that are stacked together. Similarly, in some embodiments, any of the above features that is described as being performed by the processing unit 142 may alternatively be performed by a plurality of processing units 142 at the respective network switch devices 100 that are stacked together. FIG. 5 illustrates an example of a stacked configuration in which multiple network switch devices 100a-100b are stacked together. Network switch device 100a is communicatively coupled to a network monitoring instrument 170a, and nodes 160a, 160b. Network switch device 100b is communicatively coupled to a network monitoring instrument 170b, and node 160c. Network switch device 100c is communicatively coupled to network monitoring instruments 170c, 170d, and node 160d. In some embodiments, the stacked network switch devices 100 may be considered to be a network switch appliance itself.

Figure 6:
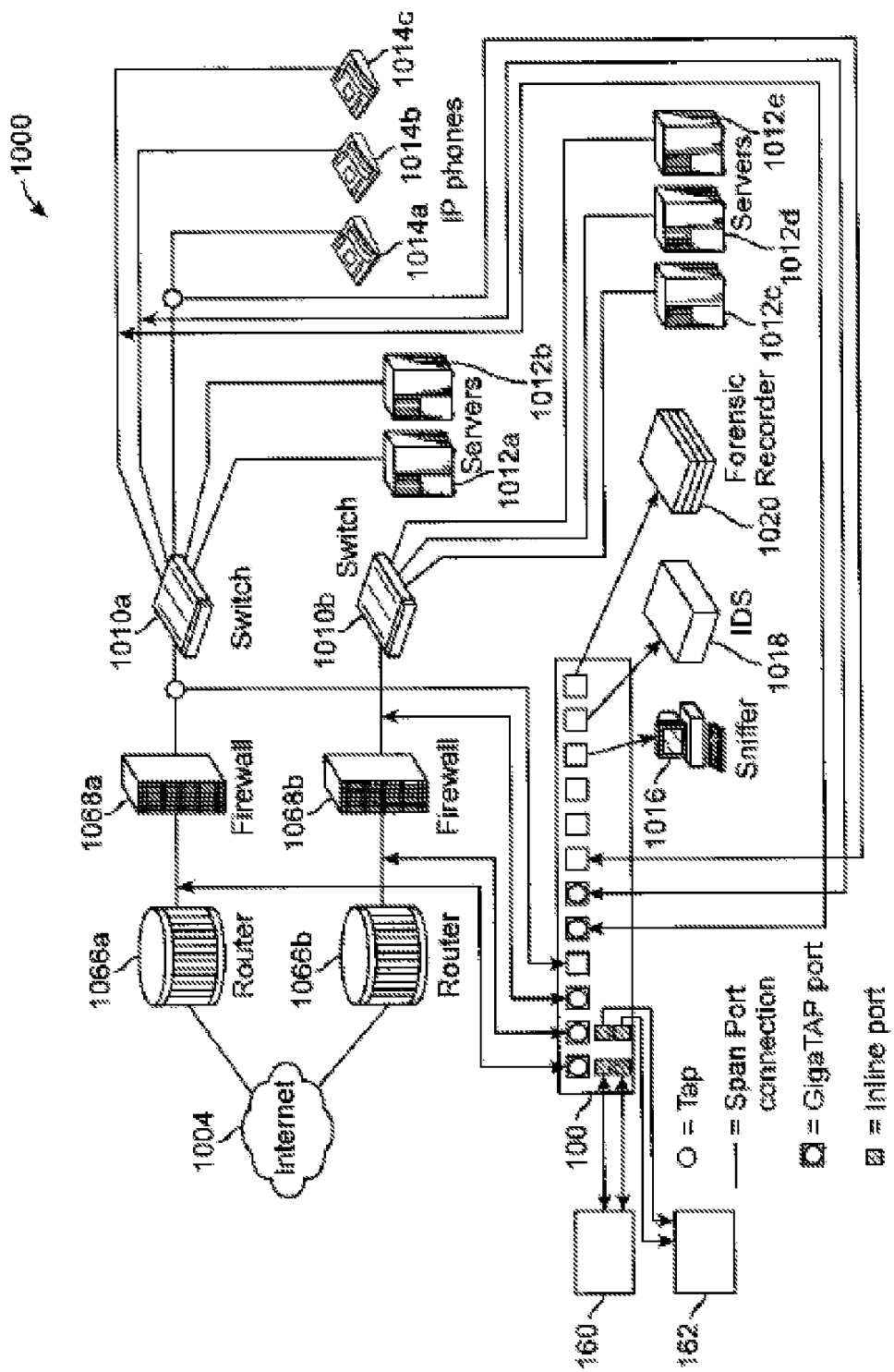
FIG. 6 illustrates a deployment of a network switch appliance in accordance with some embodiments.

FIG. 6 shows the deployment of the network switch device 100 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the device 100. As illustrated in FIG. 6, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066*b* and firewall 1068*b*, and firewall 1068*b* and switch 1010*b*) because the same non-pass through instruments can now access information anywhere in the network environment 1000 through the device 100. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014*a-c* can be easily configured to be sent to an IDS 1018. It is also possible that traffic inside a particular IP phone 1014*a-c* connection can be sent to a sniffer 1016, and Intrusion Detection System 1018 and a forensic recorder 1020 simultaneously via the one-to-many function.

In some embodiments, when using the device 100, one or more non-pass through instruments (such as IDS, sniffer, forensic recorder, etc.) may be connected to instrument port(s), and one or more pass through instruments (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 100, the device 100 can compare whether the IDS or the IPS sees more threats, and/or can have a redundant protection such that if the IPS misses any threat, the IDS may pick it up.

Specialized Computer System Architecture

Figure 7:
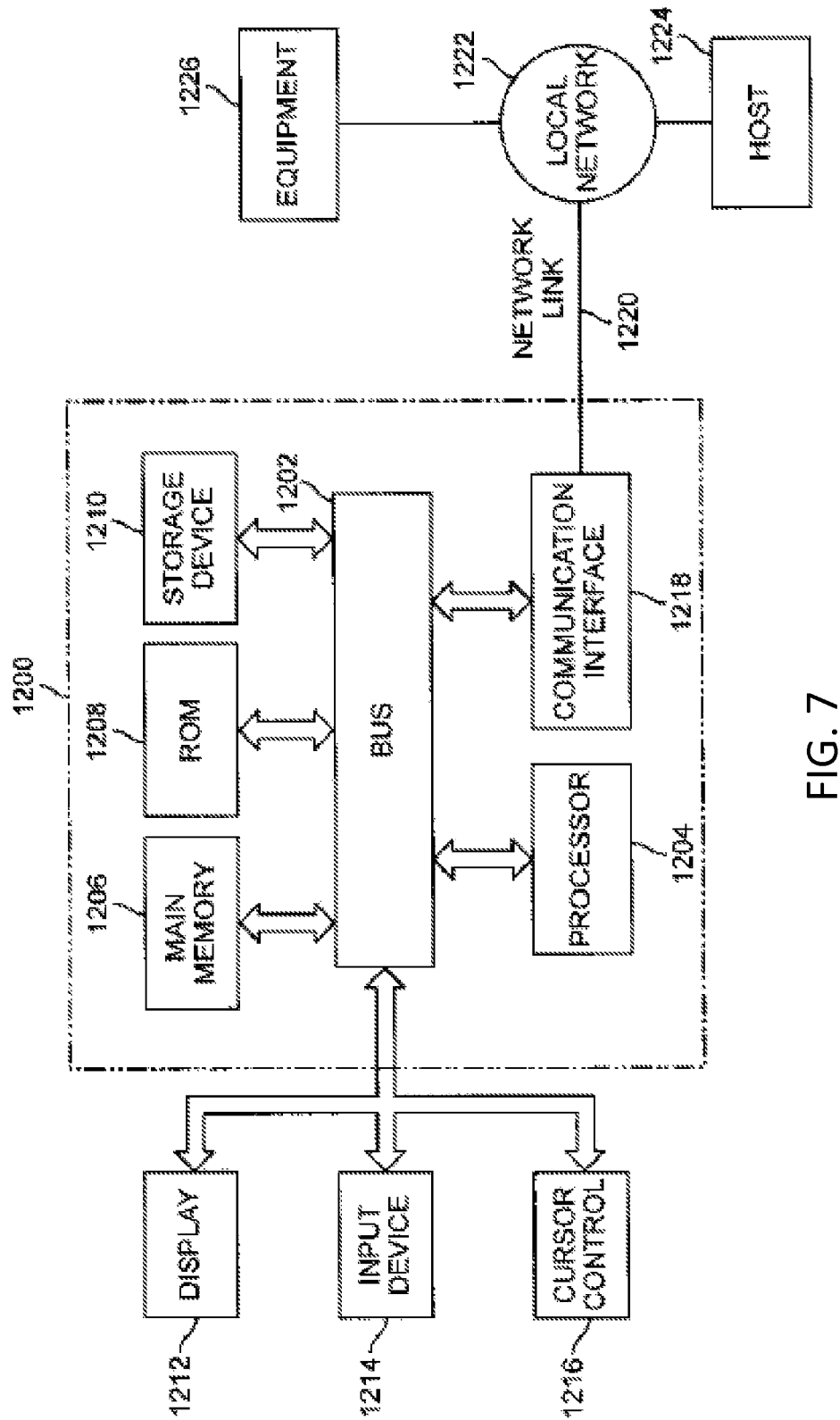
FIG. 7 illustrates an example of a computer system with which embodiments described herein may be implemented.

FIG. 7 is a block diagram that illustrates an embodiment of a specialized computer system 1200 upon which embodiments described herein may be implemented. For example, in some embodiments, the specialized computer system 1200 may be used to implement one or more functions of the processing unit 142 described herein. Computer system 1200 includes a bus 1202 or other communication mechanism for communicating information, and a specialized processor 1204 coupled with the bus 1202 for processing information. The specialized processor 1204 may be used to perform various functions described herein. For example, in some embodiments, the specialized processor 1204 may be configured to determine information regarding an input interface of the routing device 164, to determine information regarding an output interface of the routing device 164, to determine CRCs for respective packets and to compare the CRCs to determine whether the packets are duplicate copies, to determine whether to drop one or more packets, to determine which instrument ports to output information, to determine whether one or more packets belong to a user-defined category, or any combination of the foregoing.

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it. Also, a "packet" may refer to any part of a packet. For example, a "packet" may be a header of a packet, a payload of a packet, or both.

It should be noted that the terms "first", "second", etc., are used to refer to different things, and do not necessarily refer to the order of things. For example, the term "first packet" may refer to any packet generated and/or received in any order, and should not be limited to a packet that is the first in order. Similarly, the term "first CRC" may refer to any CRC determined in any order, and should not be limited to a CRC that is determined first in order.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A method performed by a network device that taps to a network having a routing device, comprising:
   determining a first information regarding an input interface of the routing device for a packet using a processing unit by:
      receiving a first packet tapped from the network; and
      determining the first information based on a destination address of the first packet by comparing the destination address of the first packet with a source address of a discovery protocol packet;
   determining a second information regarding an output interface of the routing device for the packet using the processing unit;
   determining whether the packet belongs to a user-defined category based on one or more mapping formation defined at the network device; and
   storing the packet, the first information regarding the input interface of the routing device, the second information regarding the output interface of the routing device, and information regarding the user-defined category in a non-transitory medium in association with each other.

2. The method of claim 1, wherein the network device comprises a plurality of network ports configured to communicate with the network, and a plurality of instrument ports configured to communicate with respective network monitoring instruments.

3. The method of claim 2, wherein the network device further comprises a processing unit configured to perform the acts of determining.

4. The method of claim 1, wherein the user-defined category is defined for a subscriber of the network device.

5. The method of claim 1, wherein the non-transitory medium comprises one or more data center.

6. The method of claim 1, wherein the act of determining the second information regarding the output interface of the routing device comprises:
   receiving a second packet tapped from the network; and
   determining the second information based on a source address of the second packet.

7. The method of claim 6, wherein the act of determining the second information based on the source address of the second packet comprises comparing the source address of the second packet with a destination address of a discovery protocol packet.

8. The method of claim 6, further comprising:
   determining a first CRC for the first packet;
   determining a second CRC for the second packet; and
   comparing the first CRC with the second CRC at the network device to determine whether the first packet and the second packet are the same.

9. The method of claim 1, further comprising running a discovery protocol at the network device.

10. The method of claim 9, wherein the discovery protocol comprises a CDP or a LLDP.

11. The method of claim 1, wherein the network device comprises a single network appliance.

12. The method of claim 1, wherein the network device comprises multiple network appliances.

13. A network device comprising:
   one or more ports for tapping to a network, the network comprising a routing device; and
   a processing unit configured for
      determining a first information regarding an input interface of the routing device for a packet by:
         receiving a first packet tapped from the network; and
         determining the first information based on a destination address of the first packet by comparing the destination address of the first packet with a source address of a discovery protocol packet;

determining a second information regarding an output interface of the routing device for the packet;

determining whether the packet belongs to a user-defined category based on one or more mapping formation defined at the network device; and associating the packet, the first information regarding the input interface of the routing device, the second information regarding the output interface of the routing device, and information regarding the user-defined category, with each other; and a non-transitory medium for storing the packet, the first information regarding the input interface of the routing device, the second information regarding the output interface of the routing device, and information regarding the user-defined category in association with each other.

14. The network device of claim 13, further comprising a plurality of network ports configured to communicate with the network, and a plurality of instrument ports configured to communicate with respective network monitoring instruments.

15. The network device of claim 13, wherein the user-defined category is defined for a subscriber of the network device.

16. The network device of claim 13, wherein the non-transitory medium comprises one or more data center.

17. The network device of claim 13, wherein the processing unit is configured for determining the second information regarding the output interface of the routing device by:
receiving a second packet tapped from the network; and
determining the second information based on a source address of the second packet.

18. The network device of claim 17, wherein the processing unit is configured for determining the second information based on the source address of the second packet by comparing the source address of the second packet with a destination address of a discovery protocol packet.

19. The network device of claim 17, wherein the processing unit is further configured for:
determining a first CRC for the first packet;
determining a second CRC for the second packet; and
comparing the first CRC with the second CRC at the network device to determine whether the first packet and the second packet are the same.

20. The network device of claim 13, wherein the processing unit is further configured for running a discovery protocol.

21. The network device of claim 20, wherein the discovery protocol comprises a CDP or a LLDP.

22. The network device of claim 13, wherein the network device comprises a single network appliance.

23. The network device of claim 13, wherein the network device comprises multiple network appliances.

* * * * *